(12) United States Patent
Wijnands et al.

(10) Patent No.: US 8,681,631 B2
(45) Date of Patent: Mar. 25, 2014

(54) LOOP DAMPENING IN A COMPUTER NETWORK

(75) Inventors: Ijsbrand Wijnands, Leuven (BE); Stefan Olofsson, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 13/484,606

(22) Filed: May 31, 2012

(65) Prior Publication Data

US 2013/0322436 A1    Dec. 5, 2013

(51) Int. Cl.
*G01R 31/08* (2006.01)
(52) U.S. Cl.
USPC .......................... 370/235; 370/389
(58) Field of Classification Search
USPC .................................. 370/389, 235
See application file for complete search history.

(56) References Cited

U.S. PATENT DOCUMENTS

2006/0064464 A1* 3/2006 Kakivaya et al. ............. 709/206
2009/0316697 A1* 12/2009 Dakshinamoorthy et al. ............................. 370/390

* cited by examiner

*Primary Examiner* — Sai-Ming Chan
(74) *Attorney, Agent, or Firm* — Edwards Wildman Palmer LLP; James M. Behmke; Stephen D. LeBarron

(57) ABSTRACT

In one embodiment, when a packet is received at a device in a network, the device may determine whether a time-to-live (TTL) value of the packet has expired. If the TTL value has not expired, the device forwards the packet to a next-hop device in the network. If the TTL value has expired, however, the device dampens a forwarding state related to the packet for an amount of time until resuming the forwarding state after that amount of time has elapsed. In an example embodiment, the packet is received within a multipoint-to-multipoint (MP2MP) bidirectional tunnel.

6 Claims, 9 Drawing Sheets

LOOP DAMPENING IN A COMPUTER NETWORK

TECHNICAL FIELD

The present disclosure relates generally to loop dampening in computer networks, particularly to loop dampening for multipoint-to-multipoint (MP2MP) bidirectional tunnels.

BACKGROUND

In computer networks, packets of data are sent from a source to a destination using a number of network elements and links according to various routing protocols. Network elements, such as routers, direct the packets along one or a plurality of links away from the source and towards the destination.

A routing loop may occur during transmission of the packets through the network, such as when an error or failure occurs. As a result, in a group of routers, the path to a particular destination may form a loop, and packets are repeatedly sent back and forth among the group of routers without reaching the intended destination. In networks which have multiple injection points of packets, such as multipoint-to-multipoint (MP2MP) bidirectional (e.g., multicast) tunnels, the loop is very likely to be continuously fed with new packets for as long as the loop exists. This can cause a packet storm in the network and severe consequences.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, when a packet is received at a device in a network, the device may determine whether a time-to-live (TTL) value of the packet has expired. If the TTL value has not expired, the device forwards the packet to a next-hop device in the network. If the TTL value has expired, however, the device dampens a forwarding state related to the packet for an amount of time until resuming the forwarding state after that amount of time has elapsed. In an example embodiment, the packet is received within a multipoint-to-multipoint (MP2MP) bidirectional tunnel.

Description

Figure 1:
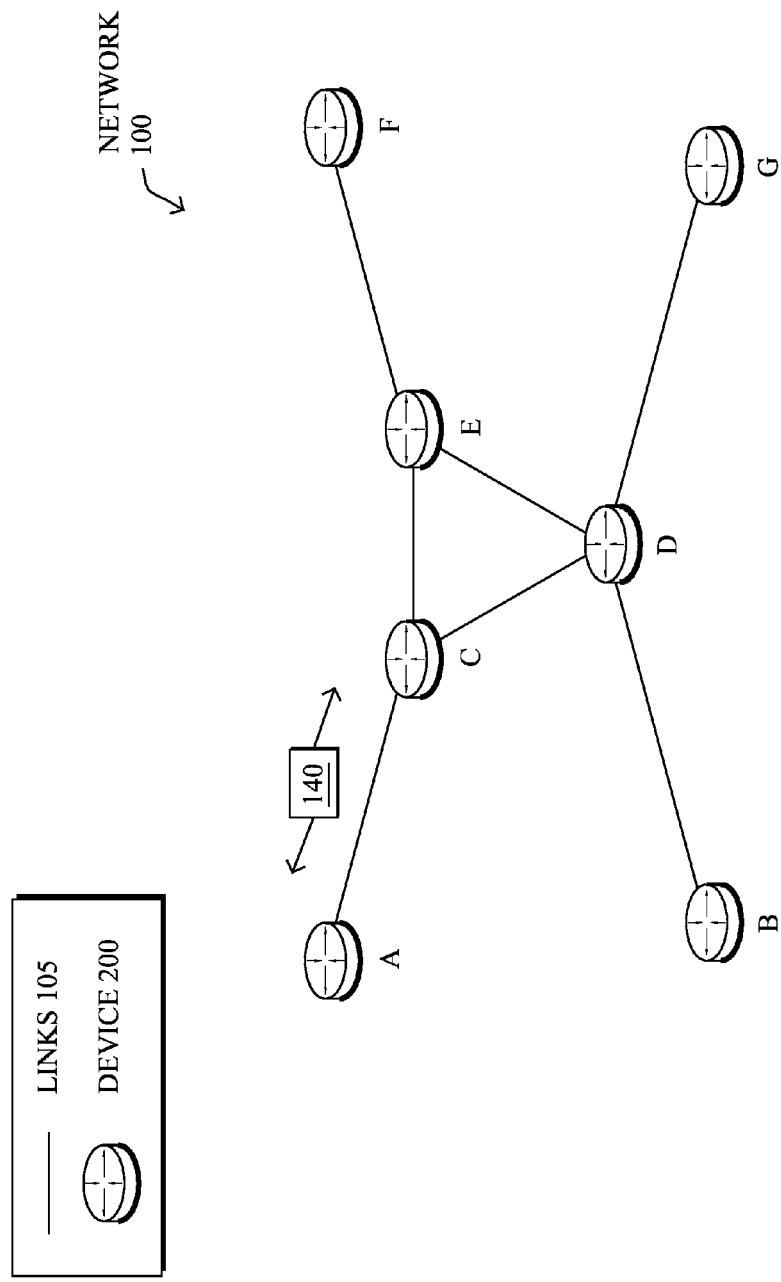
FIG. 1 illustrates an example communication network.

A computer network is a geographically distributed collection of nodes/devices interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others FIG. 1 is a schematic block diagram of an example simplified computer network 100 illustratively comprising nodes/devices 200 (e.g., labeled as shown as "A" through "G") interconnected by various methods of communication. For instance, the links 105 may be wired links or shared media (e.g., wireless links) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the computer network 100 is shown in a certain orientation, the computer network 100 is merely an example illustration that is not meant to limit the disclosure.

Data packets 140 may be exchanged among the nodes/devices of the computer network 100 using predefined network communication protocols such as certain known wired protocols, wireless protocols, or other protocols where appropriate. In this context, a protocol consists of a set of rules defining how the nodes interact with each other.

Figure 2:
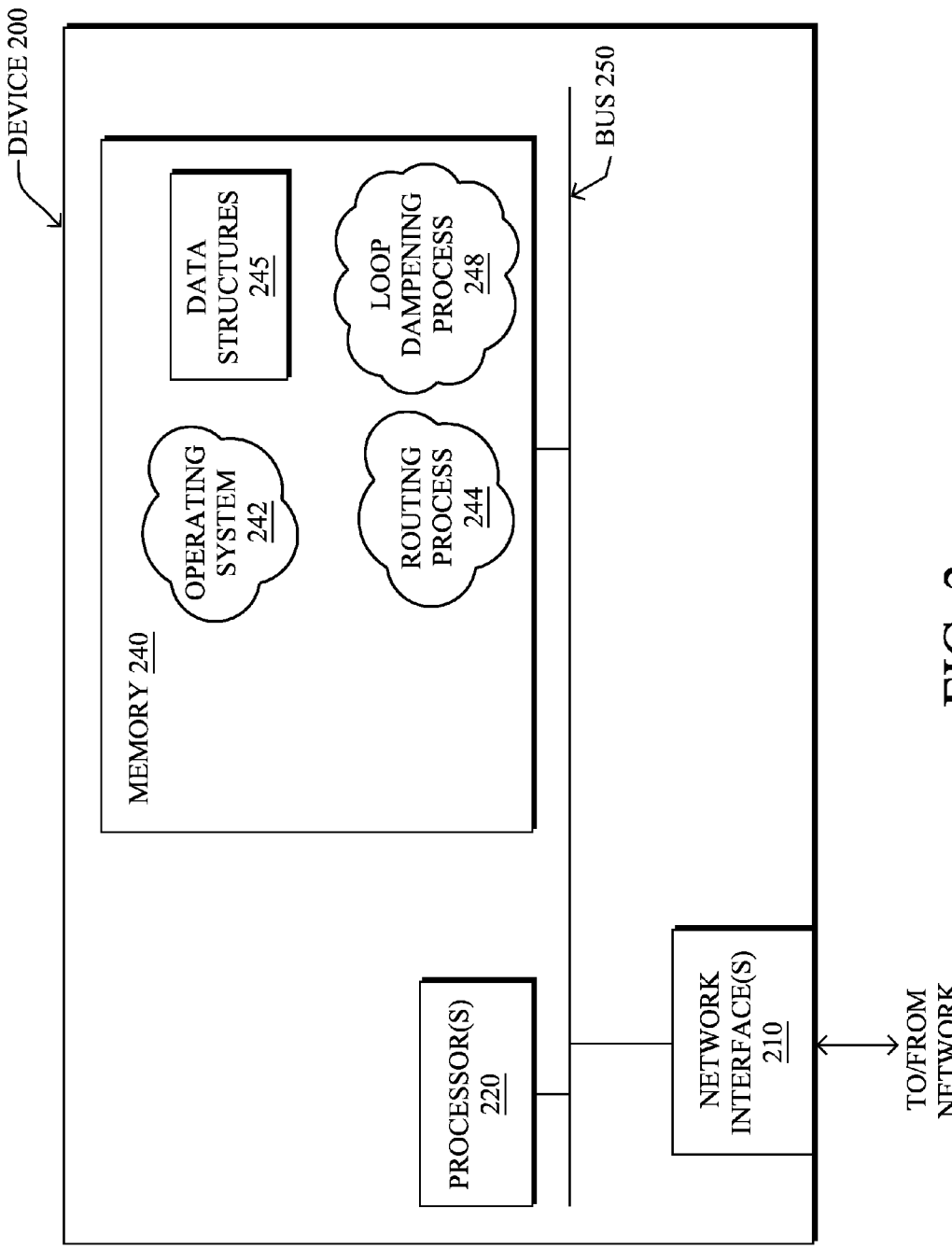
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless,), at least one processor 220, and a memory 240 interconnected by a system bus 250.

The network interface(s) 210 comprise the mechanical, electrical, and signaling circuitry for communicating data over links 105 coupled to the computer network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative loop dampening process 248, as described herein. Note that while routing process 244 and loop dampening process 248 are shown in centralized memory 240, certain embodiments provide for the processes (or portions thereof) to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 comprises computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) used to make routing/forwarding decisions for the data packet 300. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination.

In addition, routing process 244 may also provide services to configure and/or maintain one or more network tunnels, which are a logical structure that generally encapsulate a packet (a header and payload) of one protocol inside a data field of another protocol packet with a new header. For instance, in this manner, the encapsulated data may be transmitted through networks that it would otherwise not be capable of traversing. Tunnels can be established through various known protocols such as virtual private network (VPN) protocols, point-to-point tunneling protocol (PPTP), multiprotocol label switching label switched paths (MPLS LSPs), generic route encapsulation (GRE), Internet Protocol Security (IPSec), Layer-2 Tunnel Protocol (L2TP), Internet Protocol tunnels and other known tunneling methods.

Figure 3:
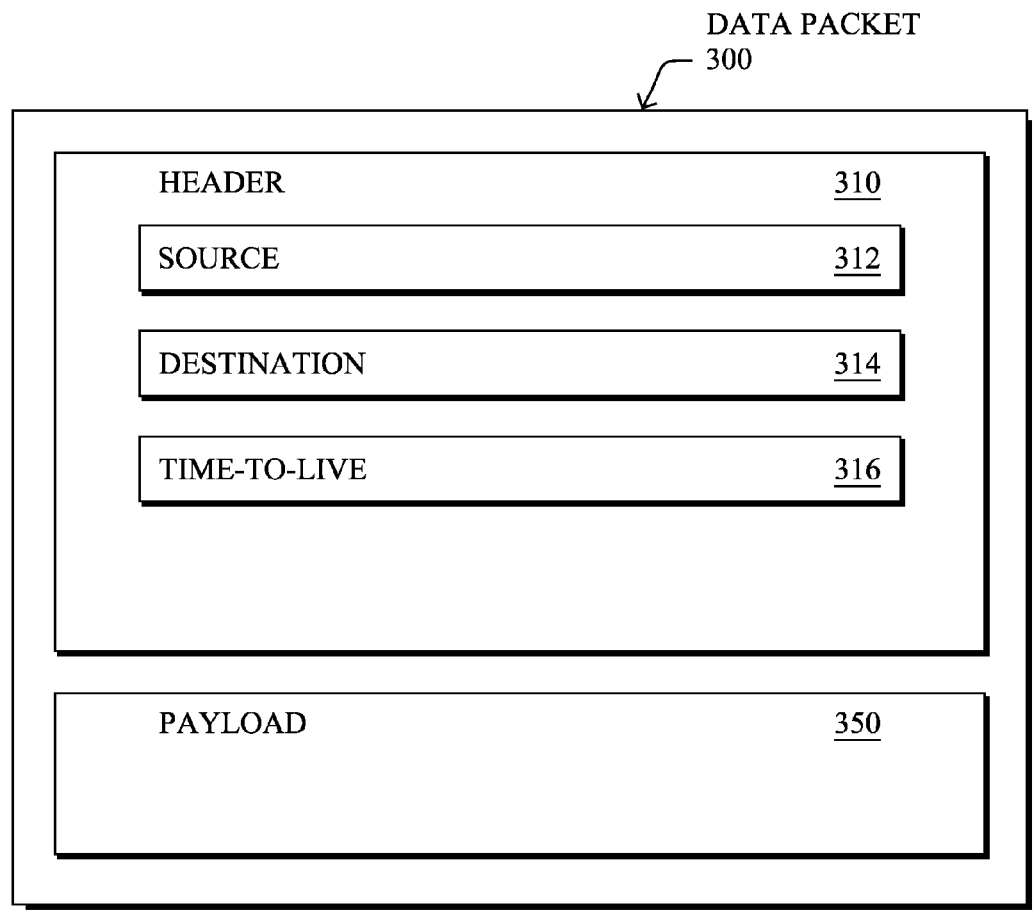
FIG. 3 illustrates an example data packet.

FIG. 3 illustrates an example simplified data packet 300. The data packet 300 includes a header 310 and a payload 350. Within the header 310 may be one or more various fields for directing the data packet 300, such as a source address 312 and a destination address 314. Additionally, as shown, a time-to-live (TTL) 316 may be implemented as a counter or timestamp attached to or embedded in the data packet 300. As is generally understood, each node receiving the packet 300 (and accessing the header 310) decrements the TTL, such that after the TTL event count (or time-span) has elapsed, the data packet 300 is discarded. The TTL thus prevents a data packet 300 from indefinitely circulating in a routing loop.

As noted above, in computer networks 100, packets of data 140 are sent from a source to a destination using a number of nodes 200 and links 105 according to various routing protocols. In unicast routing, data packets 140 are directed along one or a plurality of links 105 away from a single source towards a single destination. Each node 200 in the path looks at the destination address 314 and forwards it to the next-hop node along the best known path to the target destination. New data packets 140 may be introduced to the computer network 100 at the single source injection point.

Figure 4:
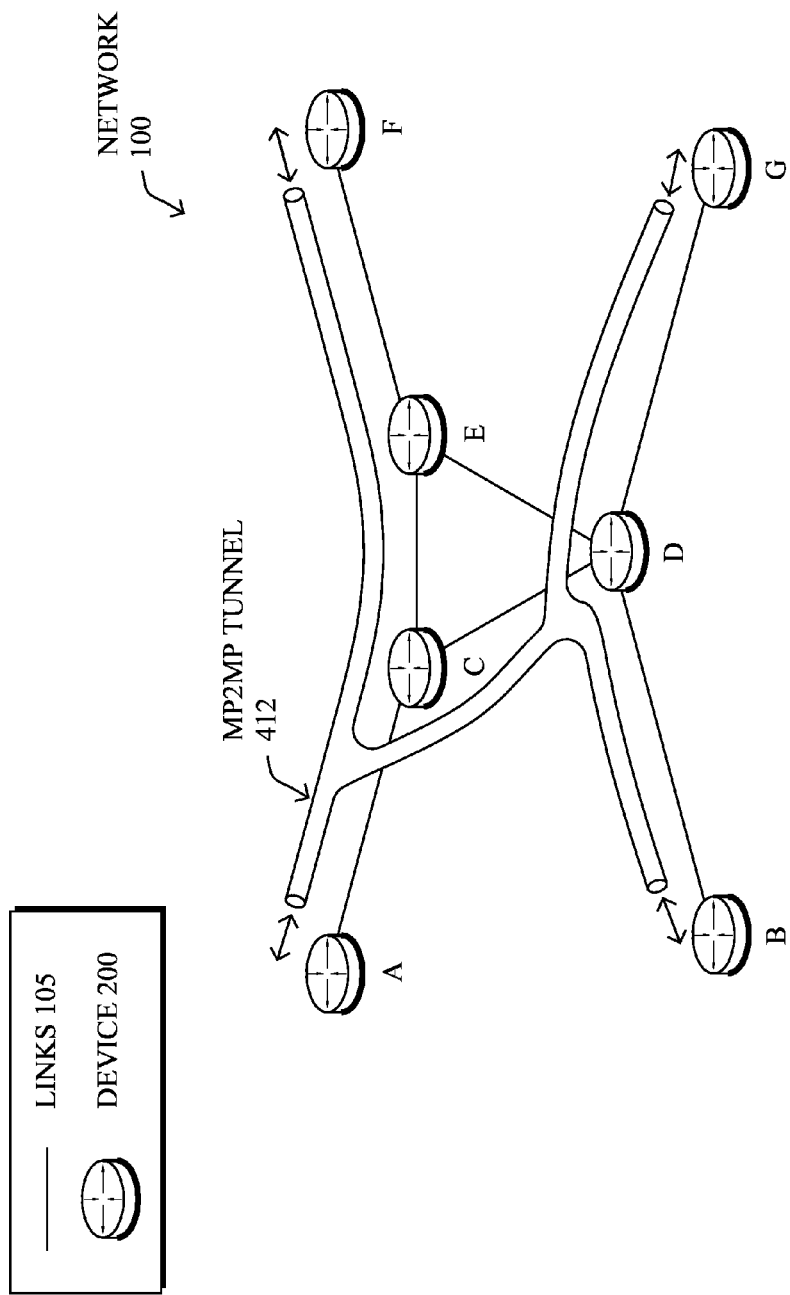
FIG. 4 illustrates an example communication network having a multipoint-to-multipoint (MP2MP) tunnel.

In multicast routing, however, the data packet's destination address 314 is a multicast group address. This allows a single data packet 300 to be forwarded to a select set of multiple nodes in the multicast group. The devices 200 within the computer network 100 are able to build packet distribution trees that allow sources to send data packets 140 to all receiving nodes. When multiple senders and multiple receivers are able to communicate multicast messages to each other over a tunnel structure, such a tunnel may be referred to as a multi-point-to-multipoint (MP2MP) tunnel (e.g., an MP2MP bidirectional tunnel). For instance, FIG. 4 illustrates an example of a simplified MP2MP tunnel 412, through which data packets 140 can be exchanged among multiple senders and multiple receivers using a number of nodes 200 and links 105. Notably, with MP2MP multicast routing, new data packets 140 may be introduced to the computer network 100 at multiple source injection points. In particular, in bidirectional multicast traffic, in addition to the complexity of multicast routing as described above, the streams of data traffic flow in opposite directions. The ability to monitor and manage the flow of data packets 140 in bidirectional tunnels 412 is far more difficult yet necessary to achieve well-operating networks.

Figure 5:
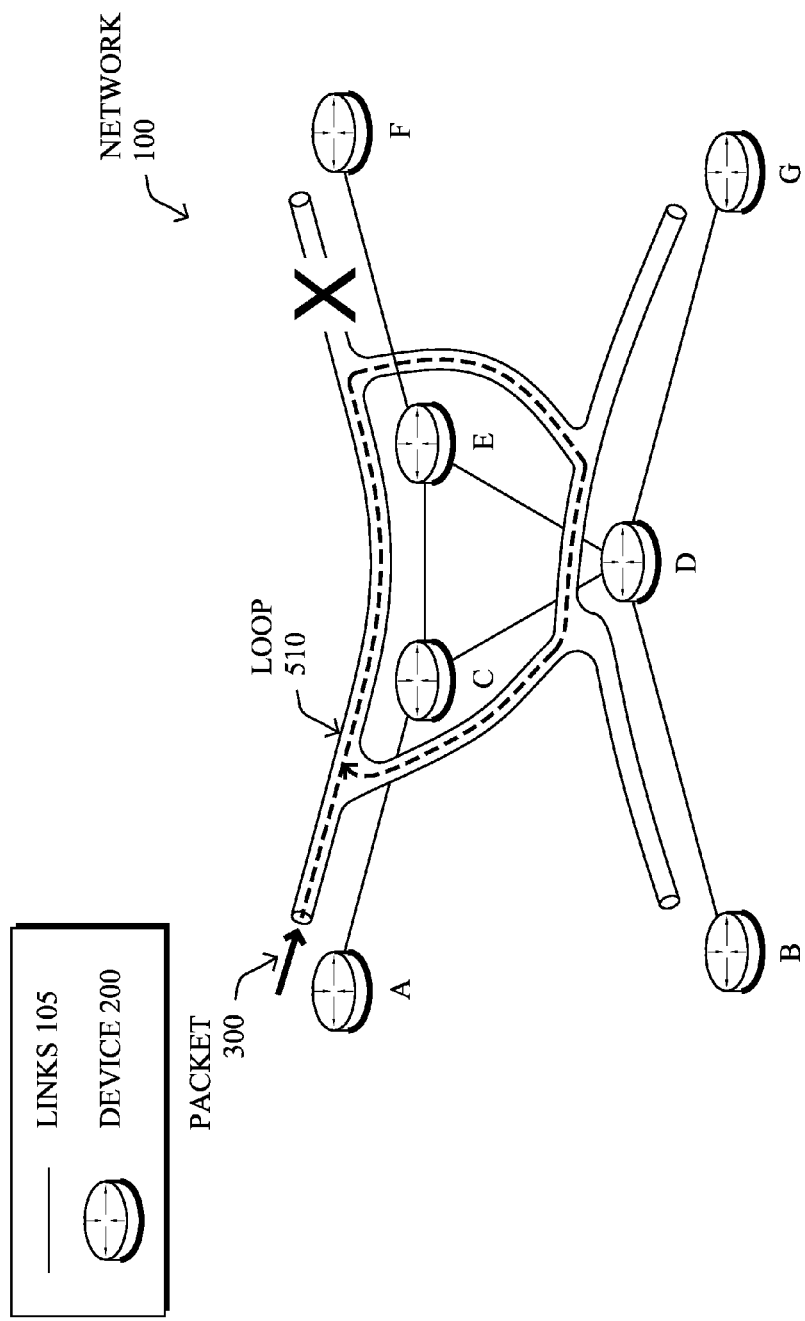
FIG. 5 illustrates the example communication network of FIG. 4 and an example data packet and related packets in a routing loop.

As also noted above, when errors or failures are present in the network, loops can form where packets are endlessly forwarded (e.g., until expiration of a TTL within each individual packet). As shown in FIG. 5, for example, a routing loop 510 may occur when the path to a particular destination forms a loop among a group of nodes 200. For example, as shown, device "E" may have determined a failure of its E-F link, or else may be otherwise misconfigured, and forwards the packet 300 to device "D". Upon receipt, device D forwards the packet to device "C" according to its vision of the MP2MP tunnel, and then device C sends the packet again to device E to repeat the loop. The data packet 300 thus continues to be routed in an endless circle around the loop 510. While the routing loop 510 persists in the computer network 100, the data packets 140 will "hang" and/or are not delivered to the destinations.

Loops in general are problematic in computer networks, though in multicast routing, there are multiple source injection points for new data packets 140, making it very likely that the routing loop 510 is continuously fed with new packets for as long as the loop exists. This can cause a packet storm in the computer network 100 with severe consequences, such as increased latency and potential network disruption.

When a routing loop 510 occurs in a computer network 100, the computer network 100 may converge to address the looping error. "Network convergence" is the process of synchronizing network forwarding tables (data structure 245) after a topology change. The computer network 100 is said to be converged when all of the forwarding tables (data structure 245) are synchronized across the network, relative to the position of each device in the topology. Network convergence is also known as network restoration since it heals the lost or blocked connections.

The techniques herein, therefore, provide for loop dampening in computer networks, which may be particularly well-suited for use with loops in MP2MP bidirectional tunnels. Specifically, according to one or more embodiments of the disclosure as described in detail below, when a packet is received at a device in a network, the device may determine whether a time-to-live (TTL) value of the packet has expired. If the TTL value has not expired, the device forwards the packet to a next-hop device in the network. However, if the TTL value has expired, the device dampens a forwarding state related to the packet for an amount of time until resuming the forwarding state after that amount of time has elapsed. In this manner, additional traffic fed into the loop (e.g., from multiple inputs) does not continue to loop until TTL expiration. Rather, by dampening or shutting down the forwarding state at a node for all related traffic in response to one (or more) TTL expiration(s), the techniques herein prevent looping storms while the network attempts to correct the loop through convergence (or administrator intervention).

Illustratively, the techniques described herein may be performed by hardware, software, and/or firmware, such as in accordance with the loop dampening process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various routing protocols, tunneling protocols, etc., and as such, may be processed by similar components understood in the art that execute those protocols, accordingly.

Operationally, the techniques herein make use of the TTL 316 of a packet to determine whether to route/forward the data packet 300 to the next-hop device, and whether to dampen/suspend the forwarding state of the node/device 200. In particular, when a data packet 300 is received at a node/device 200, the node/device decrements the TTL 316 value, and then determines whether or not the TTL value has expired (e.g., 0 value). An expired TTL value, if set properly, may be taken as an indication that a routing loop 510 is present in the computer network 100. In response to an expired TTL (e.g., of the first or a configured plurality of packets), the techniques herein dampen or shutdown the forwarding state of the node/device 200 for an amount of time, rather than further congesting the computer network 100 by routing/forwarding the data packet 300 until the computer network 100 has had a chance to achieve network convergence and resolve the routing loop 512.

Notably, while the forwarding state of the node/device 200 is dampened, shutdown, discontinued, or the like, the data packet 300 and subsequently received related packets will be discarded or dropped and not forwarded to the next-hop device. Subsequently received packets may be determined to be "related" if they have a same label, same group, and/or same class as the data packet 300. Subsequently received packets may also be determined to be "related" if they have the same source and/or destination as the data packet 300 that triggered the dampening. By dampening the forwarding state of the node/device 200 and discarding the data packet 300 and/or subsequently received related packets, new or additional data packets that are introduced into the computer network 100 are prevented from further congesting the routing loop 510.

In certain embodiments, the forwarding state of the node/device 200 may be dampened for a configurable amount of time, such as, e.g., approximately 100 milliseconds to 2 seconds, depending upon how long the computer network 100 would need to converge. In other embodiments, the forwarding state of the node/device 200 is dampened until the received data packet 300 and a configured amount of related packets have been discarded. After the amount of time has elapsed, the node/device 200 resumes its forwarding state, and subsequently received data packets will be forwarded to the next-hop device. If the routing loop 510 still exists after the dampening period, then forwarding state of the node/device 200 would be dampened or shutdown again.

In certain embodiments, the TTL value corresponds to an amount of time that approximately matches or equals the amount of time expected for network convergence to occur. In other embodiments, TTL value is configurable. Such TTL value may be configured upon the data packet 300 entering the bidirectional tunnel 412 to be of sufficient value to correspond to the amount required (plus some overage) for such data packet 300 to exit the bidirectional tunnel 412 (e.g., a number of expected hops, such as twenty). Illustratively, in certain embodiments where tunneling is used, the TTL may be specific to the tunnel (e.g., a tunnel/encapsulation header), and not a TTL of the packet itself (e.g., IP header).

Notably, insufficient dampening of the forwarding state of the node/device 200 may occur if the TTL 316 is too low. Specifically, if the TTL 316 is too low, the data packet 300 will expire prematurely and the node/device 200 will unnecessarily dampen or shutdown its forwarding state, thereby affecting the routing/forwarding of subsequently received related packets to the next-hop devices. This potential problem can be avoided by a variety of ways, including but not limited to checking of TTL value before the data packet 300 enters the network or tunnel 412 and preventing such data packet 300 from entering if the TTL value is determined to be too low, as well as configuring the TTL value to an appropriate value, for example, to correspond to at least enough time for such data packet 300 to exit the network or tunnel 412.

In yet other embodiments, the forwarding state at the device may be resumed prior to conclusion of the dampening period in response to a routing change being detected by the particular device/node 200 (e.g., a change to the forwarding tables (data structure 245) used for routing/forwarding). Presumably, such a routing change may indicate to the device that network convergence has occurred, and the local change has likely corrected the network loop that caused the dampening in the first place.

Figure 6A:
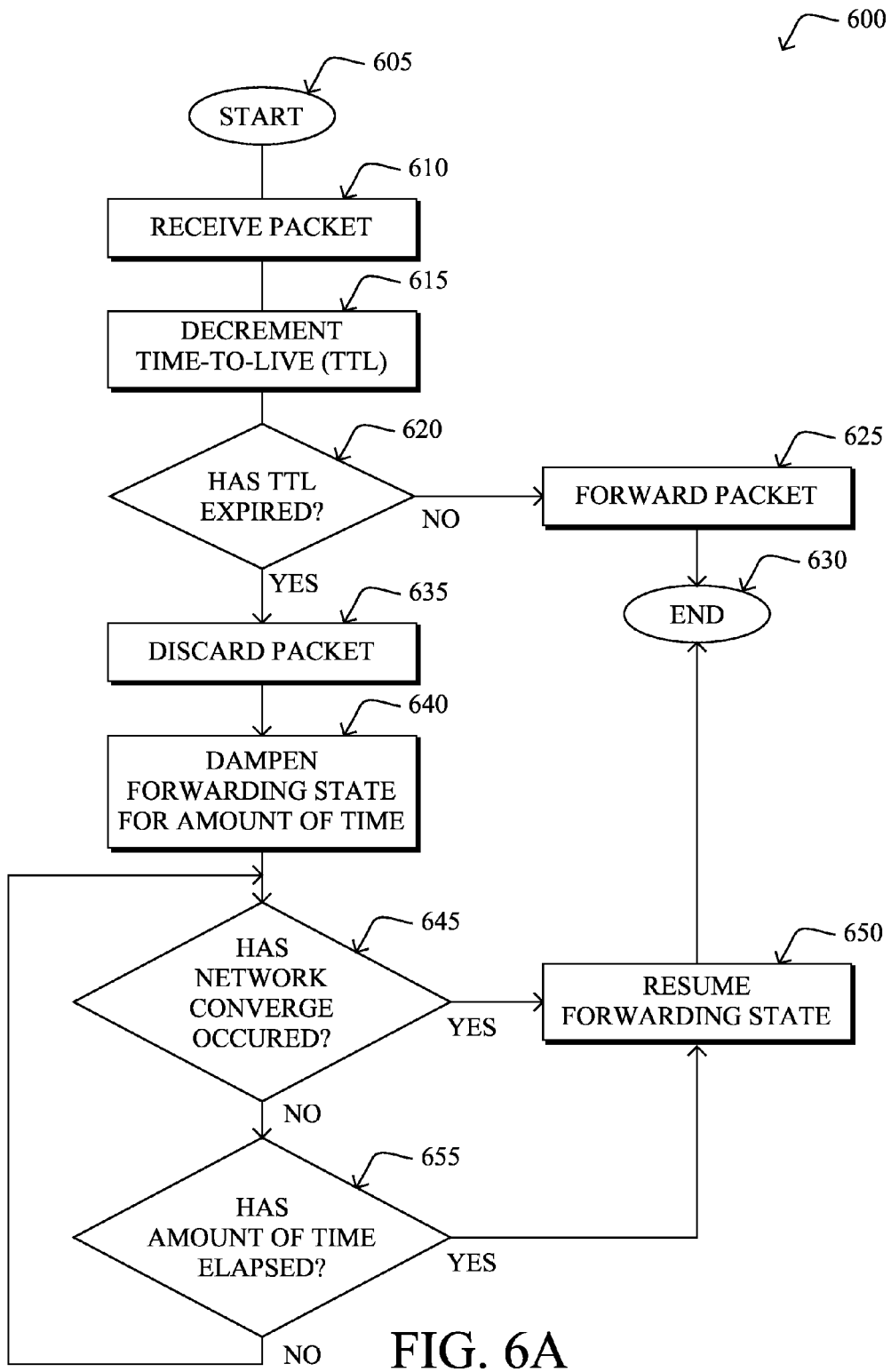
FIGS. 6A-6B illustrate an example simplified procedure for dampening the routing of a data packet.

FIG. 6A illustrates an example simplified procedure for dampening the forwarding state related to a data packet 300 for an amount of time, if appropriate, until resuming the forwarding state after that amount of time has elapsed in accordance with one or more embodiments described herein. The example simplified procedure 600 is illustrative and, in alternative embodiments, certain steps can be performed in a different order, in parallel with one another, or omitted entirely, and/or certain additional steps can be performed without departing from the scope and spirit of the invention.

The procedure 600 may start at step 605, and continues to step 610, where, as described in greater detail above, the data packet 300 is received at a node/device 200. In step 615, the TTL 316 value is decremented at the node/device 200, and in step 620, the node/device 200 determines whether the TTL 316 has expired. If not, the procedure continues to step 625, and the node/device 200 routes/forwards the data packet 300 to the next-hop device. The procedure 600 may then end in step 630, notably with the ability to continue routing/forwarding subsequently received packets, etc.

If, however, the TTL 316 has expired in step 620, the procedure 600 continues to step 635 where the data packet 300 is discarded, and then to step 640, where the forwarding state of the node/device 200 is dampened for an amount of time (e.g., milliseconds to seconds), as described above. Once the forwarding state has been dampened, the node/device 200 may then determine in step 645 whether network convergence has occurred during the dampening period. If the network has converged, the forwarding state of the node/device 200 is resumed in step 650, and the procedure 600 may end in step 630 (e.g., to receive additional packets 300 to be forwarded according to the newly converged network topology). If the network does not converge in step 645 prior to the specified amount of time elapsing in step 655, then only once the amount of time has elapsed does the device resume the forwarding state of the in step 650, and the procedure 600 may then end in step 630.

Figure 6B:
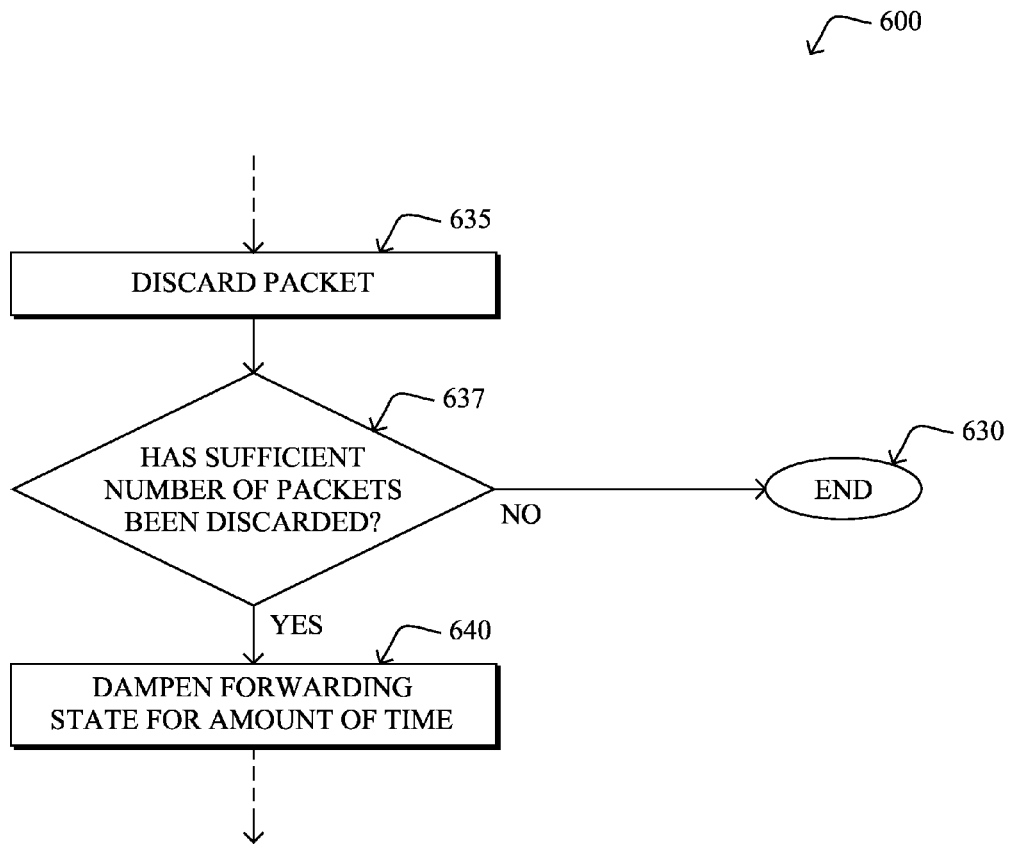

In addition, FIG. 6B illustrates an alternative portion of the procedure of FIG. 6A between steps 635 and 640 in accordance with one or more additional embodiments herein, where in an additional step 637 the node/device 200 may first determine whether a sufficient number of data packets 300 have been discarded prior to dampening the forwarding state. In particular, if a sufficient number of data packets 300 have not been discarded, the procedure 600 proceeds to step 630 and awaits additional packets to be dropped. However, if a sufficient number of data packets 300 have been discarded, for example, indicating with greater certainty that a loop exists and/or that substantial traffic is being placed into the loop, the procedure 600 may proceed to step 640 to dampen the forwarding state as described above. In other words, in certain embodiments, the device dampens the forwarding state related to the packet only if the TTL value has expired for a configured plurality of related packets (e.g., including the first received and dropped packet).

Figure 7:
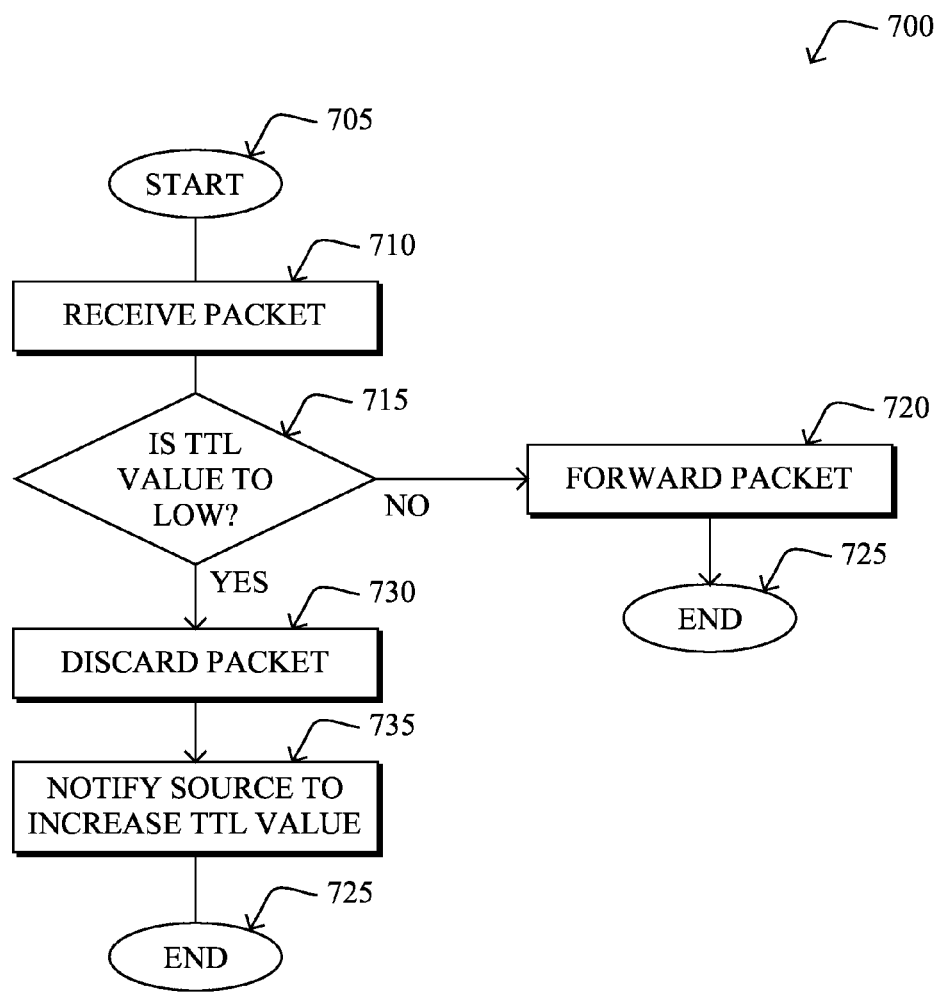
FIG. 7 illustrates an example simplified procedure for configuring a time-to-live (TTL) value.

FIG. 7 illustrates a first example simplified procedure for configuring the TTL value in accordance with one or more embodiments described herein. The example simplified procedure 700 illustrative and, in alternative embodiments, certain steps can be performed in a different order, in parallel with one another, or omitted entirely, and/or certain additional steps can be performed without departing from the scope and spirit of the invention.

The procedure 700 may start at step 705 and continues to step 710, where, as described in greater detail above, a data packet 300 is received at the node/device 200, such as at the entry to a network 100 and/or tunnel 412. In step 715, the node/device 200 determines whether the TTL value is too low (e.g., would not reach the destination even without a loop in the network), and if not, the procedure continues to step 720, and the node/device 200 routes/forwards the data packet 300 to the next-hop device. The procedure 700 may then end in step 725, notably with the ability to continue routing/forwarding subsequently received packets, etc. However, if the TTL value is too low in step 715, the procedure continues to step 730 where the data packet 300 may be discarded. In step 735, the node/device 200 may notify the packet's source to increase the TTL value to an appropriate value (e.g., at least the length of the tunnel and/or distance of the network), and the procedure 700 ends in step 725.

Figure 8:
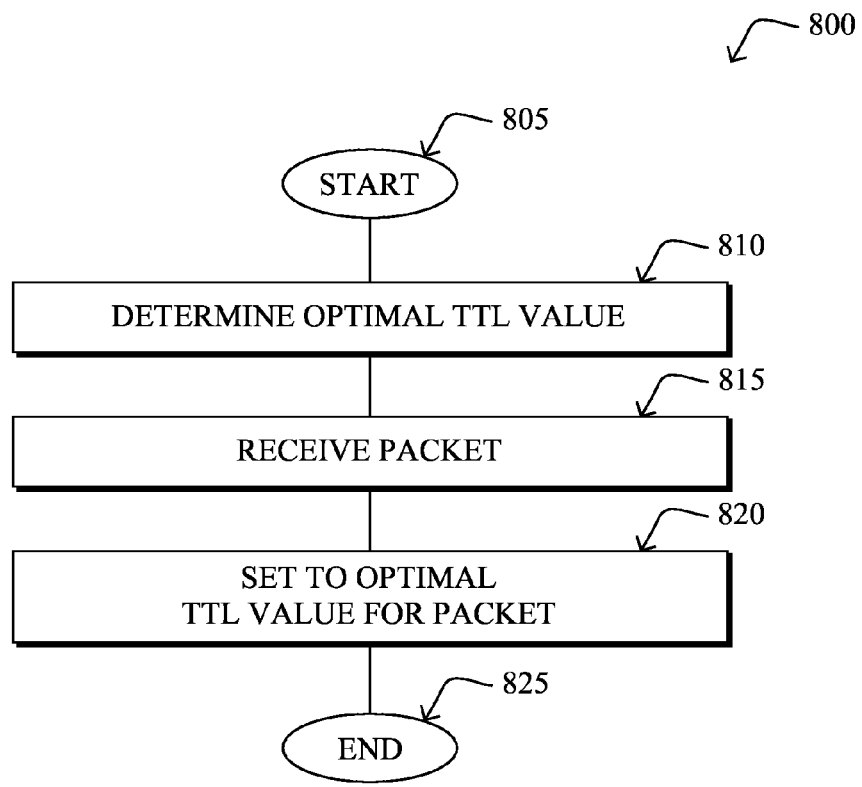
FIG. 8 illustrates another example simplified procedure for configuring the TTL value.

Alternatively, FIG. 8 illustrates yet another example simplified procedure for configuring the TTL value in accordance with one or more embodiments described herein. The example simplified procedure 800 illustrative and, in alternative embodiments, certain steps can be performed in a different order, in parallel with one another, or omitted entirely, and/or certain additional steps can be performed without departing from the scope and spirit of the invention.

The procedure 800 may start at step 805 and continues to step 810, where, as described in greater detail above, an optimal TTL value is determined at the source or entry of the network or tunnel. In step 815, the node/device 200 receives the data packet 300, and sets the TTL to the optimal TTL value for the data packet 300 in step 820. The procedure 800 may then end in step 825, notably with the ability to continue routing/forwarding subsequently received packets, etc., and possibly updating the optimal TTL value based on network changes over time.

It should be noted that while certain steps within procedures 600-800 may be optional as described above, the steps shown in FIGS. 6A-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

While there have been shown and described illustrative embodiments that provide for loop dampening by altering the forwarding state of a node/device, it is to be understood that various other adaptations and modifications may be made within the spirit and scope of the embodiments herein. For example, the embodiments have been shown and described herein with occasional reference to multicast networks and/or MP2MP bidirectional tunnels. However, the embodiments in their broader sense are not as limited, and may, in fact, be used with other types of networks and/or protocols. In addition, while certain protocols are shown, such as PIM, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
   one or more network interfaces to communicate within a computer network;
   a processor coupled to the network interfaces and adapted to execute one or more processes; and
   a memory configured to store a process executable by the processor, the process when executed configured to:
   receive a packet having a time-to-live (TTL) value;
   determine whether the TTL value has expired at the apparatus;
   forward the packet to next-hop device in the network if the TTL value has not expired;
   dampen a forwarding state related to the packet for an amount of time when the TTL value has expired; and
   resume the dampened forwarding state after the amount of time has elapsed.

2. The apparatus as in claim 1, wherein the process when executed to dampen is further configured to:
   discard the packet and one or more subsequently received related packets at the apparatus.

3. The apparatus as in claim 1, wherein the process further configured to:
   determine that network convergence has caused a forwarding change at the device; and in response, resume the forwarding state of the device prior to the amount of time elapsing.

4. A tangible, non-transitory, computer-readable media having software encoded thereon, the software when executed by a processor configured to:
    receive a packet at a device, the packet having a time-to-live (TTL) value;
    determine whether the TTL value has expired at the device;
    forward the packet to a next-hop device if the TTL value has not expired;
    dampen a forwarding state related to the packet at the device for an amount of time when the TTL value has expired; and
    resume the dampened forwarding state at the device after the amount of time has elapsed.

5. The computer-readable media as in claim 4, wherein the software when executed is further configured to:
    discard the packet and one or more subsequently received related packets at the device.

6. The computer-readable media as in claim 4, wherein the software when executed is further configured to:
    determine that network convergence has caused a forwarding change at the device; and
    in response, resume the forwarding state of the device prior to the amount of time elapsing.

* * * * *